United States Patent
Jessup et al.

(10) Patent No.: US 11,485,309 B2
(45) Date of Patent: Nov. 1, 2022

(54) DEPLOYABLE RESTRAINT BARRICADE FOR A MOTOR VEHICLE

(71) Applicant: Indiana Mills & Manufacturing, Inc., Westfield, IN (US)

(72) Inventors: Chris P. Jessup, Sheridan, IN (US); Jeffrey A. King, Markleville, IN (US); Steven Gale, Colfax, IN (US); Douglas W. Bittner, Indianapolis, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 17/115,269

(22) Filed: Dec. 8, 2020

(65) Prior Publication Data
US 2021/0170975 A1    Jun. 10, 2021

Related U.S. Application Data

(60) Provisional application No. 62/946,117, filed on Dec. 10, 2019.

(51) Int. Cl.
*B60R 21/21* (2011.01)
*B60R 21/13* (2006.01)
*B62D 23/00* (2006.01)

(52) U.S. Cl.
CPC ............ *B60R 21/13* (2013.01); *B62D 23/005* (2013.01); *B60Y 2200/20* (2013.01)

(58) Field of Classification Search
CPC ....... B60R 21/13; B60R 21/21; B62D 23/005; B60Y 2200/02
USPC .............................................. 280/730.2, 735
See application file for complete search history.

(56) References Cited

U.S. PATENT DOCUMENTS

| | | | | |
|---|---|---|---|---|
| 5,865,462 A * | 2/1999 | Robins | ................ | B60R 21/2338 280/730.2 |
| 6,135,497 A * | 10/2000 | Sutherland | .............. | B60R 21/08 280/748 |
| 6,149,195 A * | 11/2000 | Faigle | ..................... | B60R 21/08 280/730.2 |
| 6,189,960 B1 * | 2/2001 | Mumura | ............... | B60R 21/214 180/281 |
| 6,241,277 B1 * | 6/2001 | Heigl | .................... | B60R 21/232 280/730.2 |
| 6,264,234 B1 * | 7/2001 | Hill | ................... | B60R 21/23184 280/730.2 |
| 6,505,853 B2 * | 1/2003 | Brannon | ............... | B60R 21/232 280/730.2 |

(Continued)

*Primary Examiner* — Toan C To
(74) *Attorney, Agent, or Firm* — Barnes & Thornburg LLP

(57) ABSTRACT

A restraint barricade control system may include a restraint barricade configured to be mounted to a motor vehicle at or adjacent to an occupant access opening thereof, the restraint barricade having an non-deployed state and a deployed state, at least one sensor configured to produce at least one sensor signal corresponding to movement of the motor vehicle relative to at least one axis of an axis system of the motor vehicle, at least one actuator operatively coupled to the restraint barricade, a processor operatively coupled to the at least one sensor and to the at least one actuator, and a memory having instructions therein which, when executed by the processor, causes the processor to activate the at least one actuator to deploy the restraint barricade from the non-deployed state to the deployed state based on the at least one sensor signal.

18 Claims, 11 Drawing Sheets

(56) References Cited

U.S. PATENT DOCUMENTS

| | | | | |
|---|---|---|---|---|
| 6,612,611 B1* | 9/2003 | Swann | B60R 21/21 | 280/730.2 |
| 6,773,031 B2* | 8/2004 | Haig | B60R 21/08 | 280/730.2 |
| 6,824,164 B2* | 11/2004 | Pywell | B60R 21/08 | 280/730.2 |
| 7,125,069 B2* | 10/2006 | Cacucci | B60R 21/02 | 280/730.2 |
| 7,464,962 B2* | 12/2008 | Hakansson | B60R 21/08 | 280/749 |
| 7,690,684 B2* | 4/2010 | Tobaru | B60R 21/13 | 280/756 |
| 7,698,036 B2* | 4/2010 | Watson | B60R 21/0133 | 280/5.506 |
| 7,762,579 B2* | 7/2010 | Garner | B60R 21/232 | 280/730.2 |
| 7,806,432 B2* | 10/2010 | Nelson | B60R 21/232 | 280/730.2 |
| 7,946,615 B2* | 5/2011 | Takahashi | B60J 1/2011 | 280/730.2 |
| 8,898,033 B2* | 11/2014 | Moshchuk | G06F 15/00 | 702/141 |
| 8,914,196 B1* | 12/2014 | Breed | B60R 21/0132 | 701/32.4 |
| 9,663,052 B2* | 5/2017 | Rao | B60R 21/0134 | |
| 9,791,279 B1* | 10/2017 | Somieski | G01C 21/12 | |
| 10,682,972 B2* | 6/2020 | Faruque | B60R 21/08 | |
| 10,953,830 B1* | 3/2021 | Christensen | B60R 21/01554 | |

\* cited by examiner

DEPLOYABLE RESTRAINT BARRICADE FOR A MOTOR VEHICLE

CROSS-REFERENCE TO RELATED APPLICATION

This application claims the benefit of and priority to U.S. Provisional Patent Application No. 62/946,117, filed Dec. 10, 2019, the disclosure of which is expressly incorporated herein by reference in its entirety.

FIELD OF THE DISCLOSURE

The present disclosure relates generally to restraint systems for motor vehicles, and more specifically to deployable restraint systems.

BACKGROUND

Motor vehicles may be equipped with one or more conventional deployable restraint devices, such as one or more inflatable restraint devices, which may typically be deployed during vehicle impact or rollover events.

SUMMARY

The present disclosure may comprise one or more of the features recited in the attached claims, and/or one or more of the following features and combinations thereof. In one aspect, a restraint barricade control system may comprise a restraint barricade configured to be mounted to a motor vehicle at or adjacent to an occupant access opening thereof, the restraint barricade having an non-deployed state in which the restraint barricade is stowed adjacent to the occupant access opening or is recessed within an occupant access closure of the motor vehicle, and a deployed state in which the restraint barricade extends over at least a portion of the occupant access opening or is extended away from the occupant access closure over at least a portion of the occupant access opening, at least one sensor configured to produce at least one sensor signal corresponding to movement of the motor vehicle relative to at least one axis of an axis system of the motor vehicle, at least one actuator operatively coupled to the restraint barricade, a processor operatively coupled to the at least one sensor and to the at least one actuator, and a memory having instructions therein which, when executed by the processor, causes the processor to activate the at least one actuator to deploy the restraint barricade from the non-deployed state to the deployed state based on the at least one sensor signal.

In another aspect, a restraint barricade for a motor vehicle may comprise a restraint curtain or net configured to be mounted to the motor vehicle at or adjacent to an occupant access opening of the motor vehicle, the restraint curtain or net having an non-deployed state in which the restraint curtain or net is stowed adjacent to the occupant access opening or is recessed within an occupant access closure of the motor vehicle, and a deployed state in which the restraint barricade extends over at least a portion of the occupant access opening or is extended away from the occupant access closure over at least a portion of the occupant access opening, and at least one actuator configured to be mounted to the motor vehicle, the at least one actuator operatively coupled to the restraint curtain or net, the at least one actuator responsive to activation thereof to deploy the restraint curtain or net from the non-deployed state to the deployed state.

In a further aspect, a restraint barricade for a motor vehicle may comprise a restraint panel configured to be mounted within an access closure disposed over an occupant access opening of the motor vehicle, the restraint panel having an non-deployed state in which the restraint panel is recessed within the occupant access closure of the motor vehicle, and a deployed state in which the restraint panel extends upwardly away from the occupant access closure and over at least a portion of the occupant access opening, and at least one actuator configured to be mounted to the access closure, the at least one actuator operatively coupled to the restraint panel, the at least one actuator responsive to activation thereof to deploy the restraint panel from the non-deployed state to the deployed state.

BRIEF DESCRIPTION OF THE DRAWINGS

This disclosure is illustrated by way of example and not by way of limitation in the accompanying Figures. Where considered appropriate, reference labels have been repeated among the Figures to indicate corresponding or analogous elements.

DETAILED DESCRIPTION OF THE DRAWINGS

Figure 1A:
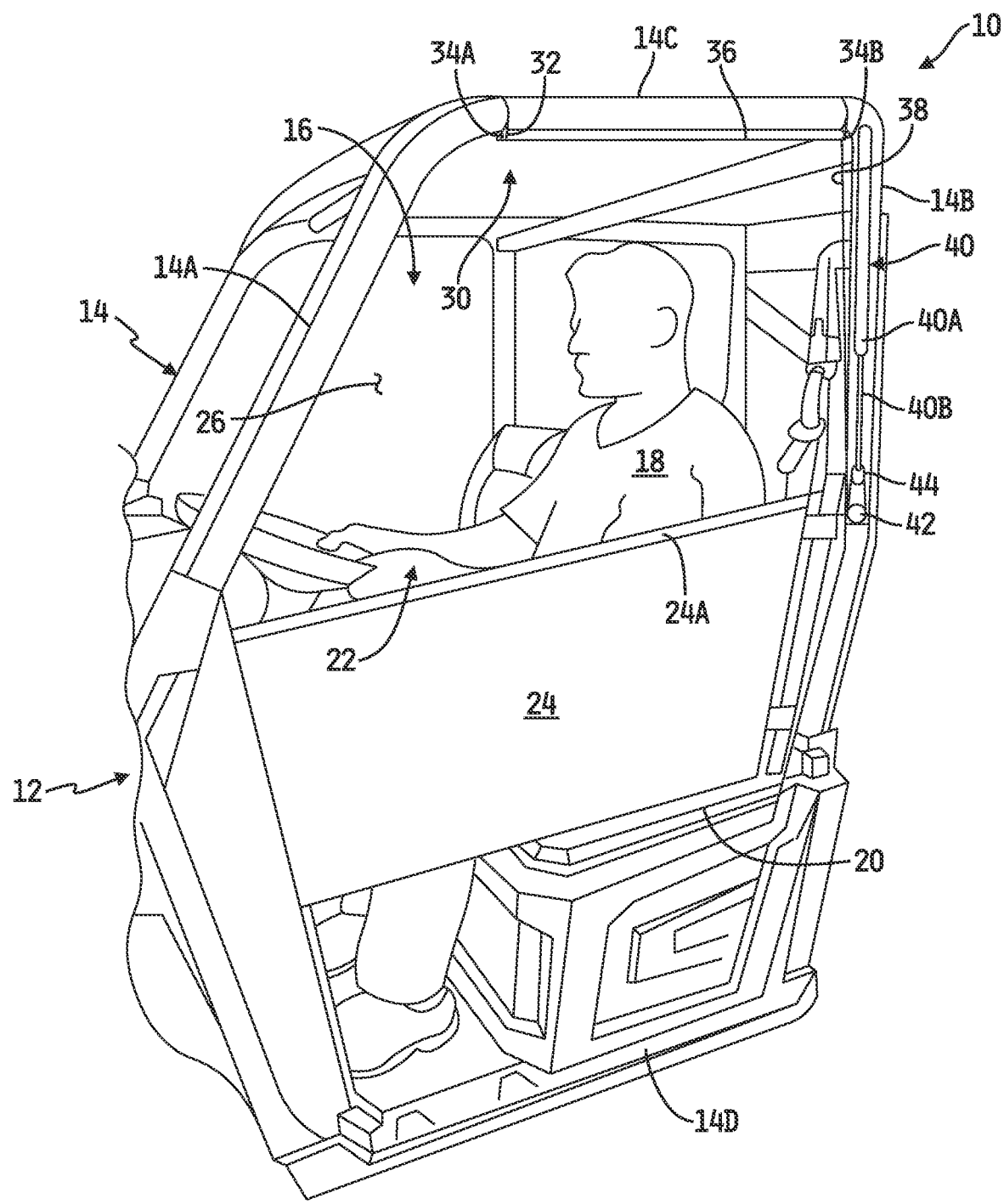
FIG. 1A is a simplified perspective view of an embodiment of a deployable restraint barricade mounted to a motor vehicle.

While the concepts of the present disclosure are susceptible to various modifications and alternative forms, specific exemplary embodiments thereof have been shown by way of example in the drawing and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

This disclosure relates to various embodiments of a deployable restraint barricade mountable to a motor vehicle and to a system for automatically deploying such a restraint barricade based on sensor data produced by one or more sensors on-board the motor vehicle and relating to an operating condition of the motor vehicle relative to its environment. In one embodiment, for example, the system is operable to automatically deploy the restraint barricade based on an orientation of the motor vehicle relative to an axis system of the motor vehicle, e.g., activated by rollover and/or imminent rollover of the motor vehicle. Alternatively or additionally, the system may be operable to automatically deploy the restraint barricade based on an acceleration condition of the motor vehicle. Alternatively or additionally still, the one or more sensors may include a manually activated switch, and the system may be operable to automatically deploy the restrain barricade based on activation of the manually activated switch. In any case, the motor vehicle in which any such deployable restraint barricade and system are mounted is illustratively, but not exclusively, an off-road motor vehicle such as an all-terrain vehicle (ATV) or the like, and it will be understood that the motor vehicle in which the restraint barricade and system may be any conventional motor vehicle without limitation.

Figure 1B:
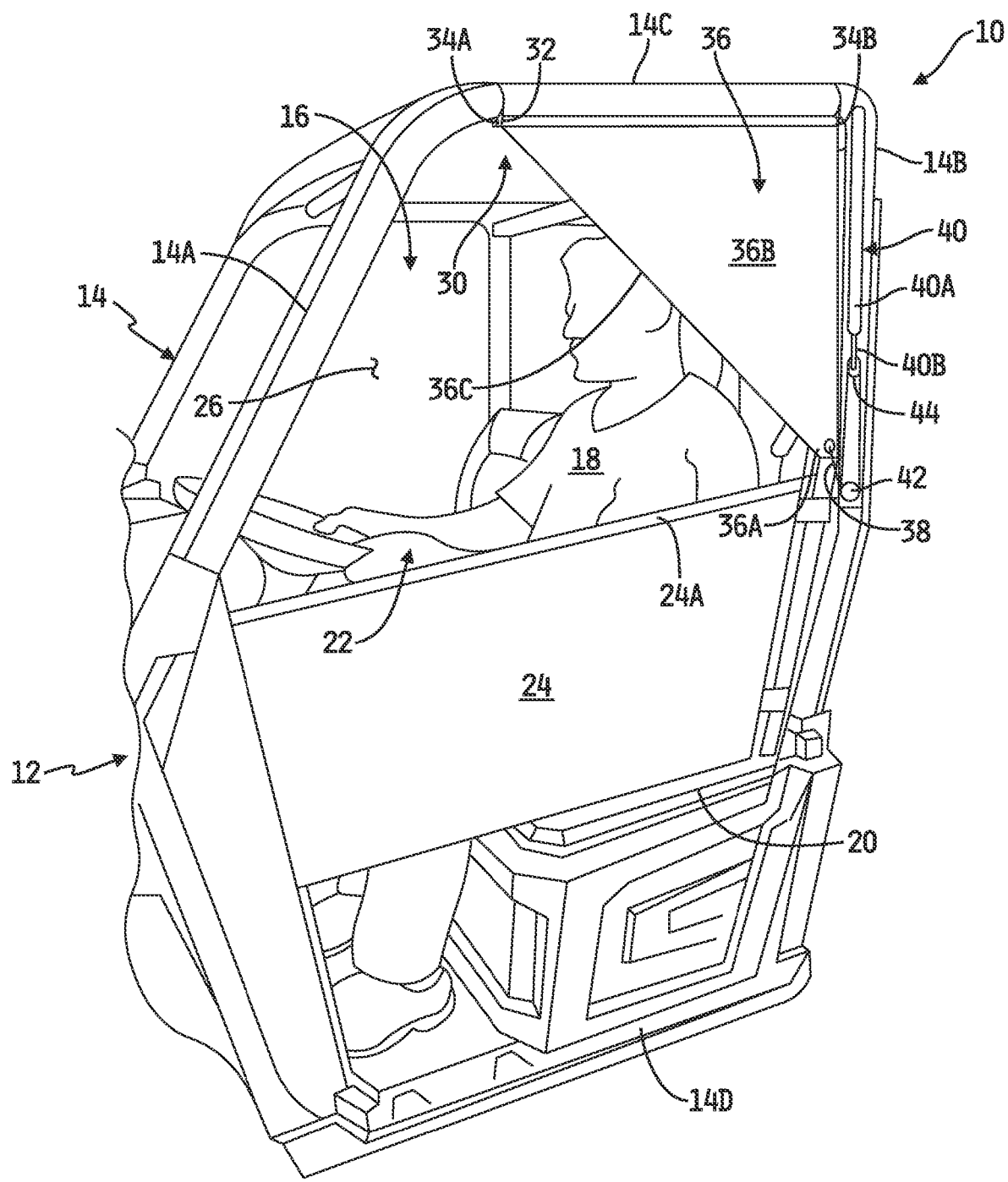
FIG. 1B is a simplified perspective view of the deployable restraint barricade and motor vehicle of FIG. 1A showing the restraint barricade in a deployed state.

Referring now to FIGS. 1A and 1B, a deployable restraint barricade system 10 is shown in which an embodiment of a deployable restraint barricade 30 is mounted to a motor vehicle 12. In the illustrated embodiment, the motor vehicle 12 includes a motor vehicle frame 14 defining an occupant compartment 16 sized to accommodate an occupant 18 supported on a vehicle seat 20. An occupant access opening 22 is illustratively defined between respective front, rear, top and bottom frame components 14A, 14B, 14C and 14D of the motor vehicle frame 14. An access closure 24, e.g., a door, is hingedly attached to a portion of the frame 14, and is configured to cover at least a portion of the occupant access opening 22 when in a closed position as shown. The access closure 24 is illustratively conventional and is actuatable between an open position to allow the occupant 18 to enter and exit the occupant compartment 16, and the closed position illustrated in FIGS. 1A and 1B. In the closed position of the access closure 24, a portion 26 of the occupant access opening 22 that is bounded by the frame components 14A, 14B, 14C and a top edge 24A of the access closure 24 remains open as illustrated by example in FIGS. 1A and 1B.

In the embodiment illustrated in FIGS. 1A and 1B, an embodiment is shown of a deployable restraint barricade 30 provided in the form of a flexible or semi-flexible 36 elongated curtain operatively mounted to the frame component 14C defining the upper boundary of the portion 26 of the occupant access opening 22. In the illustrated embodiment, the curtain 36 is rolled or wrapped about an elongated tube 32 that is rotatably mounted at opposed ends thereof to respective brackets 34A, 34B which are mounted to the frame component 14C. In the illustrated embodiment, the elongated tube 32 is mounted to the frame component 14C via the brackets 34A, 34B so as to be disposed along a bottom edge or surface of the frame component 14C, although it alternate embodiments the tube 32 may instead by mounted to the frame component 14C via the brackets 34A, 34B so as to be disposed along an outer edge or surface of the frame component 14C, along an inner edge or surface of the frame component 14C or along a top edge or surface of the frame component 14C. In some embodiments, the elongated tube 32 is illustratively conventional and includes one or more conventional biasing members configured to bias the tube 32 to rotate about its longitudinal axis in a roll-up direction; that is, in a direction which takes up the curtain 36 thereon, i.e., which wraps the curtain 36 about the tube 32. In alternate embodiments, the elongated tube 32 is configured to rotate freely about its longitudinal axis in the roll up direction and in the opposite pay-out direction, wherein the tube 32 pays out the curtain 36 in the pay-out rotational direction of the tube 32. In such alternate embodiments, one or more conventional actuators may be included to cause the elongated tube 32 to rotate about its longitudinal axis in the curtain roll-up direction.

In its non-deployed state illustrated in FIG. 1A, the curtain 36 of the restraint barricade 30 is taken up, i.e., rolled about, the elongated tube 32 with a portion 36A of a free end thereof attached to a flexible or semi-flexible cord or cable 38 as best seen in FIG. 1B. In the non-deployed state, the curtain 36 thus has a compact configuration in which it is rolled up on and about the elongated tube 32 and stowed adjacent to the occupant access opening 22. In the non-deployed state of the curtain 36 illustrated in FIG. 1A, the cord or cable 38 extends downwardly from the portion 36A of the curtain 36 along at least a portion of the frame component 14B, and is operatively coupled to an actuator 40 mounted to or within the frame component 14B of the motor vehicle. In the illustrated embodiment, the actuator 40 is a conventional linear actuator having an elongated body 40A from which an elongated arm 40B longitudinally extends. In one embodiment, the actuator 40 is electrically actuatable between an unactuated state in which the arm 40B is fully extended from the body 40A and an actuated state in which the arm 40B is fully retracted into the body 40A, although in other embodiments the actuator 40 may be alternatively or additionally configured to be mechanically, pneumatically or hydraulically actuated, and/or actuated via a conventional pressurized gas source, e.g., via a conventional, electrically actuated incendiary device or other conventional actuation device. In the non-deployed state of the curtain 36 of the restraint barricade 30, the actuator 40 is illustratively in the non-actuated state, i.e., with the arm 40B fully extended from the body 40A as depicted by example in FIG. 1A, and in the deployed state of the curtain 36 the actuator 40 is illustratively in the actuated state, i.e., with the arm 40B fully retracted within the body 40A as depicted by example in FIG. 1B, although in alternate embodiments the actuation states of the actuator 40 may be reversed.

The cord or cable 38 is operatively coupled to the free end of the arm 40B of the actuator 40 in a manner which causes the cord or cable 38 to draw the curtain 36 downwardly from the non-deployed position of the curtain 36 illustrated by example in FIG. 1A to the deployed position illustrated by example in FIG. 1B. In the example embodiment illustrated in FIGS. 1A and 1B, a pulley 42 is fixedly mounted to or within the frame member 14B of the motor vehicle 12, and another pulley 44 is fixed to the free end of the arm 40B of the actuator 40. The cord or cable 38 is illustratively routed sequentially through the pulleys 42, 44 respectively, and the free end of the cord or cable 38 is then fixed to or within the frame member 14B.

In the non-actuated state of the actuator 40 illustrated by example in FIG. 1A, the pulleys 42, 44 are in close proximity to one another such that the length of the cord or cable 38 between the pulley 42 and the portion 36A of the curtain 36 is at maximum length. Upon actuation of the actuator 40 to the actuated state, the arm 40B is retracted within the body 40A of the actuator 40 thereby drawing the pulley 44 away from the pulley which effectively shortens the length of the cord or cable 38 between the pulley 42 and the portion 36A of the curtain 36, thereby drawing the curtain 36 downwardly to the deployed position thereof illustrated in FIG. 1B in which the curtain 36 extends at least partially across the portion 26 of the occupant access opening 22. By drawing the cable or cord 38 downwardly as just described, the downward force applied to the portion 36A of the curtain 36 overcomes the biasing force of the elongated tube 32 in the curtain roll-up direction and causes the curtain 36 to unroll from the tube 32 downwardly from the frame component 14C such that a portion 36B of the curtain 36 extends at least partially across the portion 26 of the occupant access opening 22. In the deployed state, the curtain 36 thus has an expanded configuration in which it extends from the elongated tube 32 at least partially across the portion 26 of the occupant access opening 22. In the illustrated embodiment, the free edge 36C of the curtain 30 is configured such that it extends diagonally across the portion 26 of the occupant access opening 22 in a direction from a portion of the top frame component 14C adjacent to a top portion of the front frame component 14A toward a portion of the rear frame component 14B adjacent to the top edge 24A of the access closure 24. In alternate embodiments, the free edge 36C of the curtain 36 may be configured to have shapes other than diagonal, and the curtain 36 may be configured to cover more or less of the portion 26 of the occupant access opening 22 than is illustrated by example in FIG. 1B.

In any case, the restraint barricade 30 illustrated in FIGS. 1A-1B is illustratively resettable by de-actuating the actuator 40 such that the arm 40B fully extends away from the body 40A of the actuator 40 as illustrated in FIG. 1A. Upon such de-actuation of the actuator 40, the biasing force applied to the elongated tube 32 in the curtain roll-up direction causes the tube 32 to rotate in the curtain roll-up direction thereby re-wrapping the curtain 36 thereabout as depicted in FIG. 1A. It will be understood that whereas the actuator 40 is illustrated in FIGS. 1A and 1B as being mounted to the frame member 14B of the motor vehicle 12, the actuator 40 may in alternate embodiments be mounted to the frame member 14A or to the frame member 14C, and in such embodiments the cord or cable 38 may be suitably routed into operative engagement with the actuator 40 along or through any of the frame members 14A-14D.

The restraint curtain 36 is illustratively a flexible or semi-flexible material configured to serve as a restraining barrier between the occupant 18 and the environment outside of at least part of the open portion 26 of the occupant access opening 22. In one embodiment, the restraint curtain 36 is formed of a fiber reinforced polymer material, although in other embodiments the curtain 36 may be formed of a non-reinforced polymer material, a reinforced or non-reinforced textile material, or one or more other conventional materials configured to restrain at least a portion of the occupant 18 from extending outwardly from the open portion 26 of the occupant access opening 22.

Figure 2A:
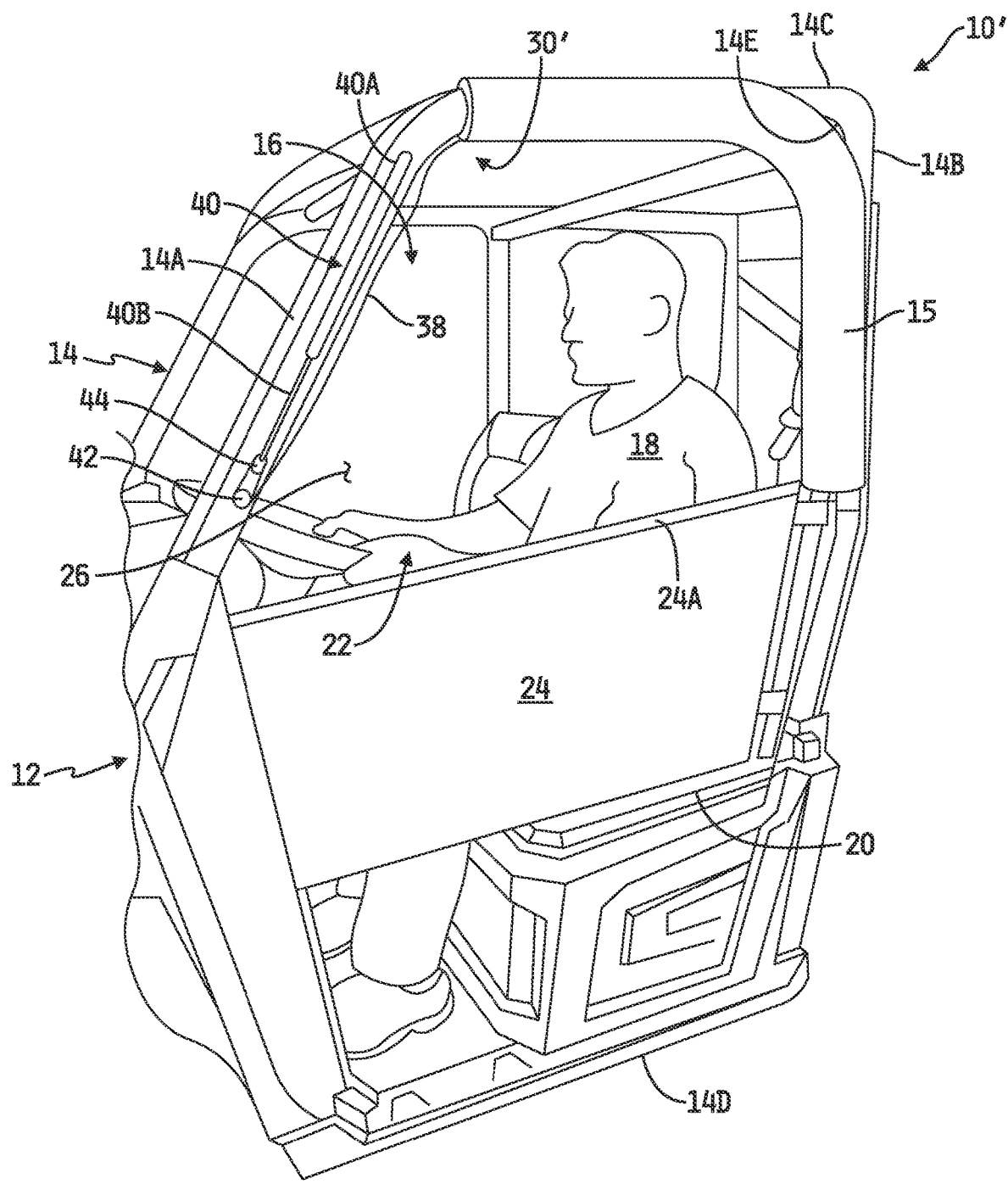
FIG. 2A is a simplified perspective view of another embodiment of a deployable restraint barricade mounted to a motor vehicle.
Figure 2B:
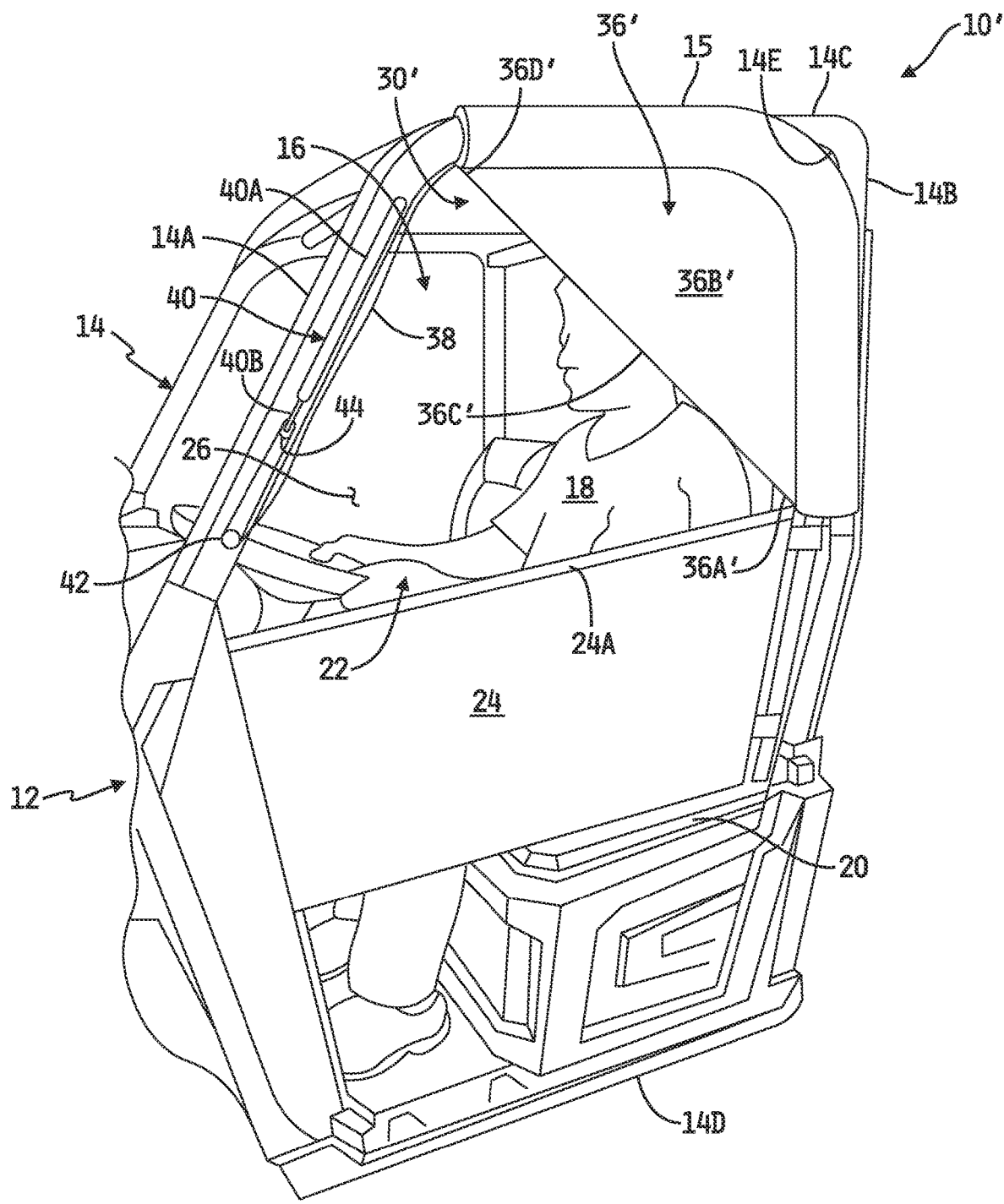
FIG. 2B is a simplified perspective view of the deployable restraint barricade and motor vehicle of FIG. 2A showing the restraint barricade in a deployed state.

Referring now to FIGS. 2A and 2B, another embodiment of a deployable restraint barricade system 10' is shown in which another embodiment of a deployable restraint barricade 30' is mounted to the motor vehicle 12. In the embodiment illustrated in FIGS. 2A-2B, the various components of the motor vehicle 12 are identified with the same reference numbers illustrated in FIGS. 1A-1B, and the description of such components will therefore not be repeated here. The motor vehicle 12 illustrated in FIGS. 2A-2B illustratively differs from the motor vehicle illustrated in FIGS. 1A-1B only in that a roll pad 15 is coupled to the frame members 14B, 14C, although it will be understood that in alternate embodiments the roll pad 15 may be omitted.

In the embodiment illustrated in FIGS. 2A and 2B, the deployable restraint barricade 30' is provided in the form of a flexible or semi-flexible curtain 36' coupled to the frame components 14B and 14C defining the upper and rear boundaries of the portion 26 of the occupant access opening 22 of the motor vehicle 12. The restraint barricade 30' is shown undeployed or non-deployed in FIG. 2A, and is shown deployed in FIG. 2B. In the undeployed state, the curtain 36' is gathered against, and/or is tucked behind, the frame component 14B and in some embodiments is also gathered against at least a portion of the frame component 14C near or adjacent to the junction 14E of the frame components 14B, 14C, whereas in the deployed state the curtain 36' is at least somewhat taught and extends along approximately the full lengths of the frame components 14B, 14C. In the example embodiment depicted in FIG. 2B, the curtain 36' is generally triangular in shape, although in alternate embodiments the curtain 36' may have any desired shape. Materially, the curtain 36' may be as described above with respect to the curtain 36.

In the illustrated embodiment, the curtain 36' is movably attached along a top edge thereof to the upper frame component 14C, and is affixed at one or more points along a rear edge thereof to the rear frame component 14B. The lower vertex 36A' of the curtain 36' is illustratively fixed in a conventional manner to the rear frame component 14B as is a portion of the rear edge of the curtain 36' near or adjacent to the junction 14E, and between these points the curtain 36' may or may not be attached in a conventional manner at one or more points along its rear edge to the rear frame component 14B. Although obscured by the roll pad 15, the upper front vertex 36D' of the curtain 36' is illustratively fixed to a conventional clip or equivalent structure that is slidably mounted to and along a bottom edge of the top frame component 14C, e.g., via a conventional channel structure which illustratively runs the length of the frame component 14C. In its non-deployed state illustrated in FIG. 2A, the vertex 13D', e.g., via the clip and channel just described, is positioned near or adjacent to the junction 14E of the frame components 14B, 14C such that the curtain 36' is relaxed and is gathered adjacent to or against, or tucked against or behind, the frame component 14B at least partially along the length of the frame component 14B to form a compact, storage configuration of the curtain 36' in its non-deployed state illustrated by example in FIG. 2A.

One end of a flexible or semi-flexible cord or cable 38 is affixed to the clip or other such structure affixed to the curtain 36' at or near its vertex 36D', or is instead affixed directly to the curtain 36' at or near its vertex 36D', and cord or cable 38 is operatively coupled to an actuator 40 mounted to the frame member 14A of the vehicle 12 as shown by example in FIGS. 2A and 2B. In the non-deployed state of the curtain 36' illustrated in FIG. 2A, the cord or cable 38 extends downwardly from the portion vertex 36D' along at least a portion of the frame component 14A, and is operatively coupled to the actuator 40 mounted to or within the frame component 14A of the motor vehicle 12. In the illustrated embodiment, the actuator 40 is a conventional linear actuator having an elongated body 40A from which an elongated arm 40B longitudinally extends, and is as described above with respect to FIGS. 1A and 1B. In the non-deployed state of the curtain 36' of the restraint barricade 30', the actuator 40 is illustratively in the non-actuated state, i.e., with the arm 40B fully extended from the body 40A as depicted by example in FIG. 2A, and in the deployed state of the curtain 36' the actuator 40 is illustratively in the actuated state, i.e., with the arm 40B fully retracted within the body 40A as depicted by example in FIG. 2B, although in alternate embodiments the actuation states of the actuator 40 may be reversed.

The cord or cable 38 is operatively coupled to the free end of the arm 40B of the actuator 40 in a manner which causes the cord or cable 38 to draw the vertex 35D' of the curtain 36' horizontally along the frame component 14C from the non-deployed position of the curtain 36' illustrated by example in FIG. 2A to the deployed position illustrated by example in FIG. 2B. In the example embodiment illustrated in FIGS. 2A and 2B, a pulley 42 is fixedly mounted to or within the frame member 14A of the motor vehicle 12, and another pulley 44 is fixed to the free end of the arm 40B of the actuator 40. The cord or cable 38 is illustratively routed sequentially through the pulleys 42, 44 respectively, and the free end of the cord or cable 38 is then fixed to or within the frame member 14A.

In the non-actuated state of the actuator 40 illustrated by example in FIG. 2A, the pulleys 42, 44 are in close proximity to one another such that the length of the cord or cable 38 between the pulley 42 and the vertex 36D' of the curtain 36' is at maximum length. Upon actuation of the actuator 40 to the actuated state, the arm 40B is retracted within the body 40A of the actuator 40 thereby drawing the pulley 44 away from the pulley which effectively shortens the length of the cord or cable 38 between the pulley 42 and the vertex 36D' of the curtain 36'. This draws the vertex 36D' of the curtain 36' horizontally along the frame component 14C and thus laterally across the top of the portion 26 of the occupant access opening 22 so as to expand and deploy a portion 36B' of the curtain 36' at least partially across the portion 26 of the occupant access opening 22 as illustrated by example in FIG. 2B. In the illustrated embodiment, the free edge 36C' of the curtain 36' is configured such that it extends diagonally across the portion 26 of the occupant access opening 22 between the lower right vertex 36A', positioned at, near or adjacent to the lower portion of the rear frame component 14B adjacent to the top edge 24A of the access closure 24, respectively adjacent to a top portion of the front frame component 14A toward a portion of the rear frame component 14B adjacent to the top edge 24A of the access closure 24, and the upper left vertex 36D' positioned at, near or adjacent to the junction of the frame components 14A, 14C. In alternate embodiments, the free edge 36C' of the curtain 36' may be configured to have shapes other than diagonal, and the curtain 36' may be configured to cover more or less of the portion 26 of the occupant access opening 22 than is illustrated by example in FIG. 2B. In some alternate embodiments, the actuator 40 may be oriented relative to the frame component 40A such that the arm 40B extends upwardly rather than downwardly as shown in FIGS. 2A and 2B, and operation of the actuator 40 may be modified as appropriate, i.e., activated and deactivated states may or may not be reversed relative to those states described above. It will be understood that whereas the actuator 40 is illustrated in FIGS. 2A and 2B as being mounted to the frame member 14A of the motor vehicle 12, the actuator 40 may in alternate embodiments be mounted to the frame member 14B or to the frame member 14C, and in such embodiments the cord or cable 38 may be suitably routed into operative engagement with the actuator 40 along or through any of the frame members 14A-14D.

In some embodiments, the restraint barricade 30' illustrated in FIGS. 2A-2B is resettable by de-actuating the actuator 40 such that the arm 40B fully extends away from the body 40A of the actuator 40 as illustrated in FIG. 1A. In some such embodiments, the restraint barricade 30' is then manually reset by moving the vertex 36D', e.g., via the clip or other structure to which the vertex 36D' is affixed or attached, rearwardly toward and to, near or adjacent to the junction 14E of the frame components 14B, 14C such that the curtain 36' resumes its non-deployed position described above. In other embodiments in which the restraint barricade 30' is resettable, the clip or other structure to which the vertex 36D' is affixed or attached may be biased in a conventional manner toward the junction 14E such that the curtain 36' automatically returns under such bias to the non-deployed or stowed position illustrated in FIG. 2A. In still other embodiments in which the restraint barricade 30' is resettable, the restraint barricade 30' may be modified to include one or more additional actuators for accomplishing an automatic reset to the non-deployed position, and one example of a modified deployable restraint barricade system 10" including such a modified restraint barricade 30" is illustrated in FIG. 3.

Figure 3:
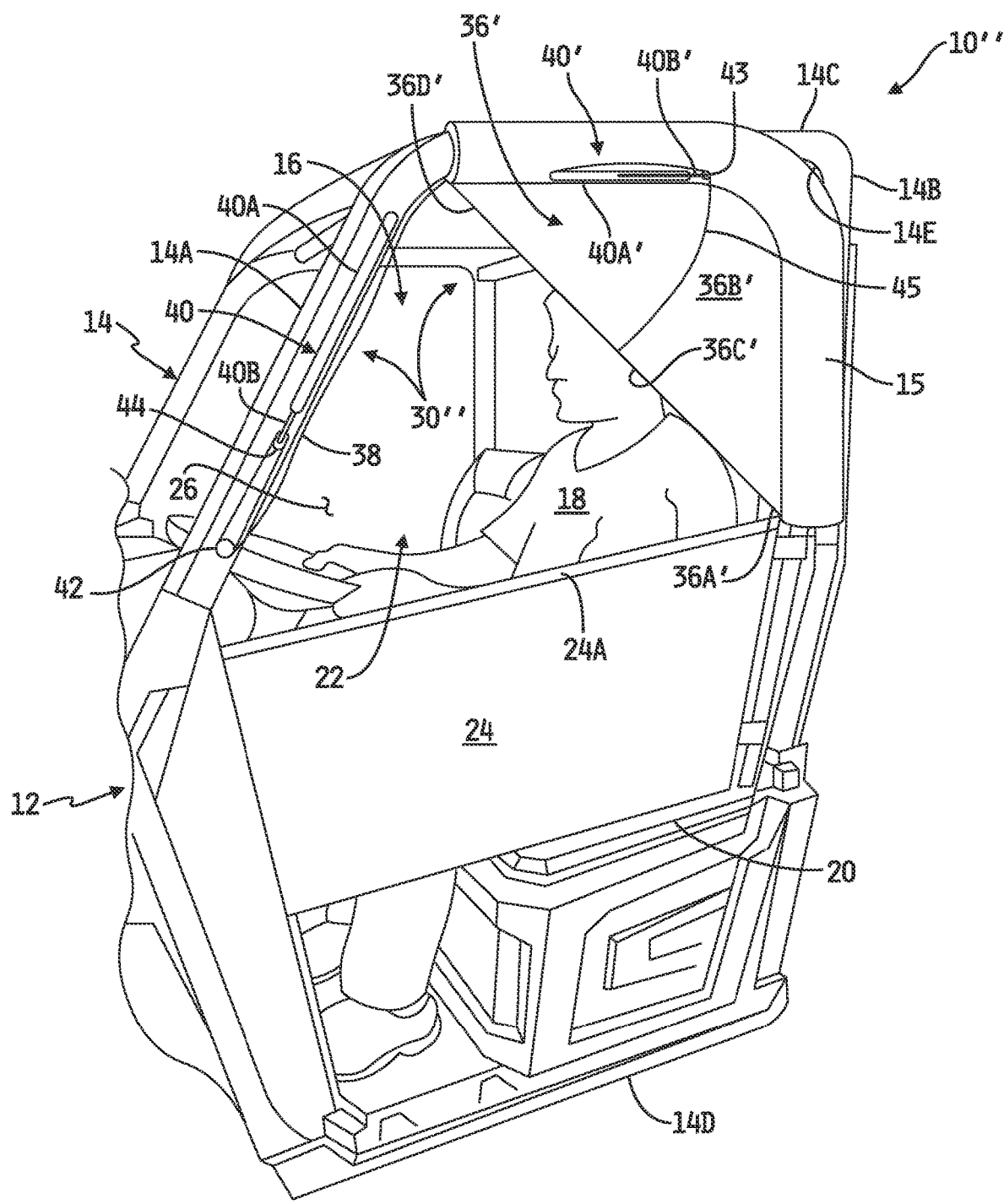
FIG. 3 is a simplified perspective view of yet another embodiment of a deployable restraint barricade mounted to a motor vehicle shown in a deployed state.

Referring to FIG. 3, the restraint barricade 30" includes several components in common with and operable as described above with respect to FIGS. 2A and 2B, and in this regard the curtain 36' is deployable from a non-deployed or stowed position to a deployed position via control of the actuator 40 as illustrated in FIGS. 2A and 2B and described above. In the embodiment illustrated in FIG. 3, the restraint barricade 30" includes another actuator 40' illustratively in the form of a linear actuator having an actuator body 40A' mounted to the frame component 14C of the motor vehicle 12 and having an actuator arm 40B' extendable from and retractable within the body 40A' as described above with respect to the actuator 40. One end of a flexible or semi-flexible cord or cable 45 is affixed to the curtain 36' (or to another suitable structure that is attached to the curtain 36') at or near its free edge 36C', and the cord or cable 45 is operatively coupled to the actuator 40' as shown by example in FIG. 3. In the illustrated example, a pulley 43 or other conventional cord guiding structure is attached to the free end of the actuator arm 40B', and the remaining free end of the cord 45 is affixes to the body 40A' of the actuator 40' and/or to the frame component 14C with a portion of the cord or cable 45 between its two ends operatively engaging the pulley 43. In the illustrated embodiment, the cord or cable 45 is attached to the curtain 36' approximately at or near a mid-point of the edge 36C' between the vertices 36A', 36D', although in alternate embodiments the cord or cable 45 may be elsewhere positioned relative to the edge 36C' or other portion of the curtain 36'.

In the deployed state of the curtain 36' illustrated in FIG. 3, the actuator 40' is in an actuated state (e.g., having been actuated with or as part of activation of the actuator 40 as described above) with the arm 40B' retracted within the body 40A' of the actuator 40' such that the cord or cable 45 extends downwardly from the pulley 43 along the inner or outer face of the deployed curtain 36', or embedded within the curtain 36', to the portion of the edge 36C' to or near which the corresponding end of the cord or cable 45 is attached or affixed. To reset the restraint barricade 30" from the deployed position of the curtain 36' illustrated in FIG. 3, the actuator 40 is first deactivated so as to extend the arm 40B out of the body 40A of the actuator to the non-deployed position of the actuator 40 illustrated by example in FIG. 2A. Upon or following deactivation of the actuator 40, the actuator 40' is likewise deactivated which extends the arm 40B' from the body 40A' to thereby shorten the length of the cord or cable 45 extending between the pulley 43 and the edge 36C' of the curtain 36'. Such shortening of the cord or cable 45 acts to pull the vertex 36D' and edge 36C' of the curtain 36' together toward the junction 14E of the frame components 14B, 14C, thereby returning the curtain 36' to its non-deployed state.

Figure 4A:
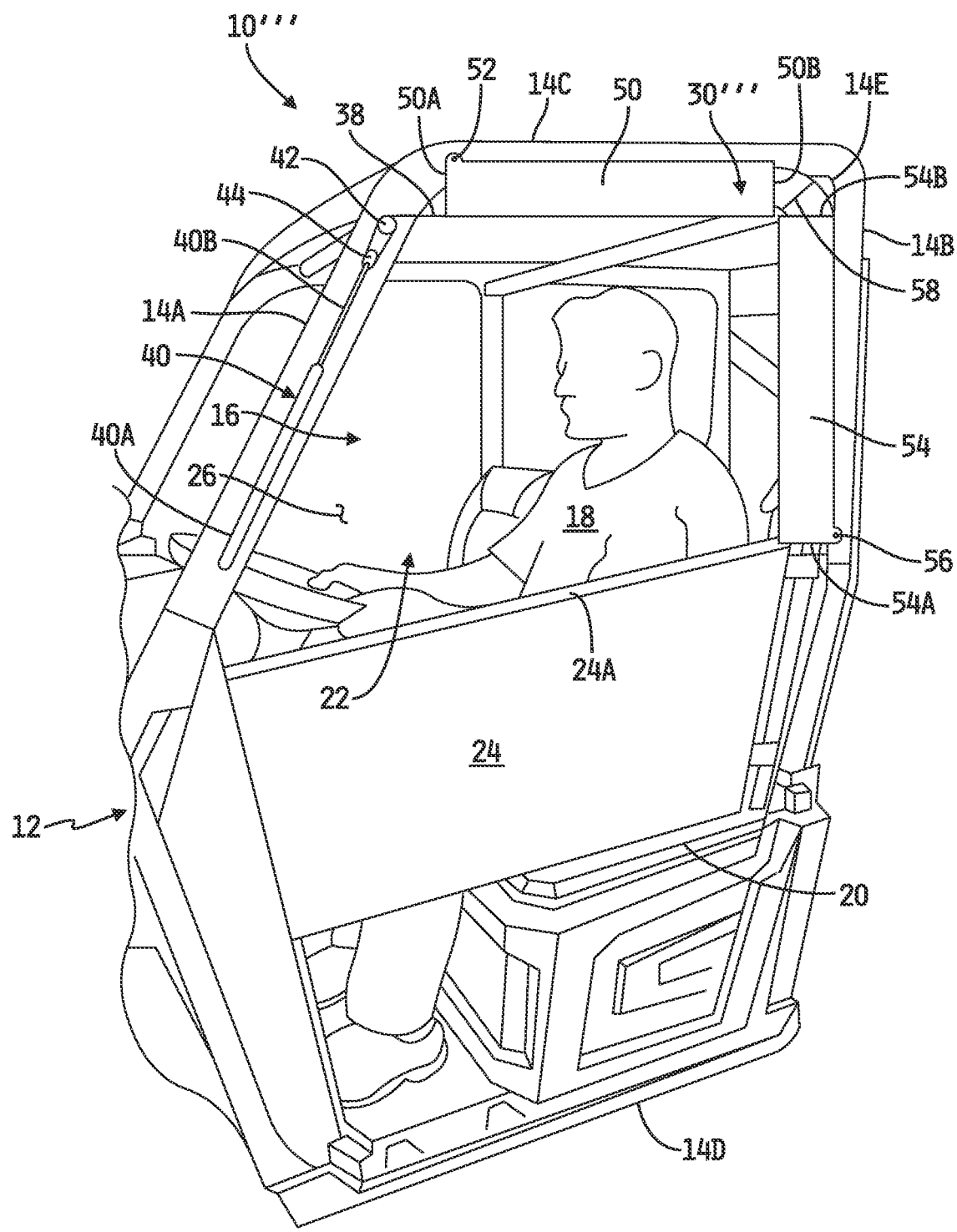
FIG. 4A is a simplified perspective view of still another embodiment of a deployable restraint barricade mounted to a motor vehicle.
Figure 4B:
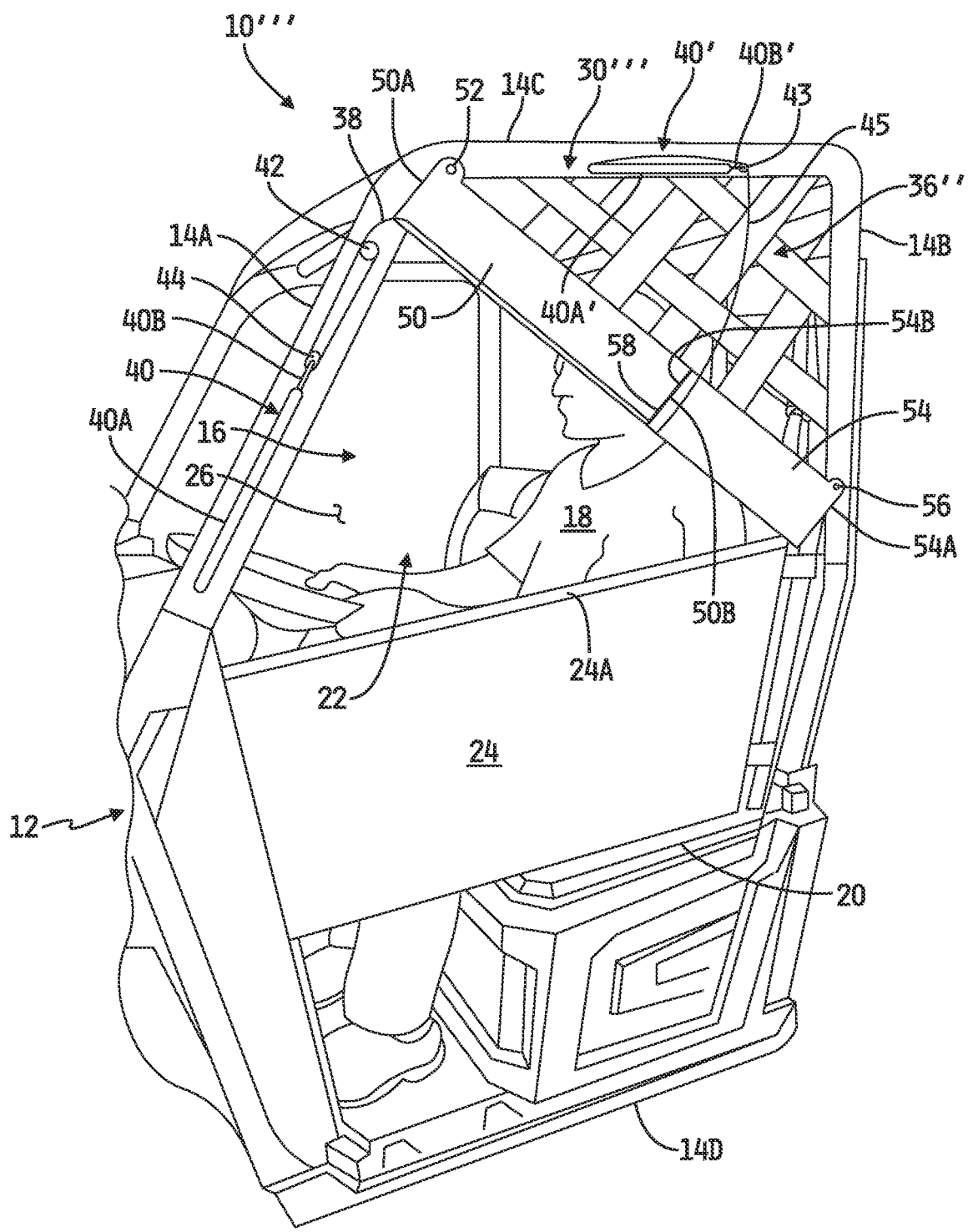
FIG. 4B is a simplified perspective view of the deployable restraint barricade and motor vehicle of FIG. 4A showing the restraint barricade in a deployed state.

Referring now to FIGS. 4A and 4B, yet another embodiment of a deployable restraint barricade system 10'" is shown in which another embodiment of a deployable restraint barricade 30'" is mounted to the motor vehicle 12. In the embodiment illustrated in FIGS. 4A-4B, the various components of the motor vehicle 12 are identified with the same reference numbers illustrated in FIGS. 1A-1B, and the description of such components will therefore not be repeated here. In the illustrated embodiment, a flexible or semi-flexible and deployable curtain 36'" is affixed at one end to a pair of deployable arms 50, 54 each hingedly connected to the frame of the motor vehicle 12 and operatively coupled to one or more actuators to control deployment of the barricade 30'".

In the illustrated embodiment, the curtain 36'"is triangular in shape with one edge of the curtain 36'"affixed to and at least partially along the rear frame component 14B, another edge of the curtain 36'"affixed to and at least partially along the top frame component 14C, and with the third edge of the curtain 36'"affixed to and at least partially along each of the deployable arms 50, 54. In the illustrated embodiment, the curtain 36'"is provided in the form of a net, although in alternate embodiments the curtain 36'"may take other forms and/or be made of any desired material, some examples of which are described above with respect to FIGS. 1A and 1B. In alternate embodiments, the curtain 36'"may take on shapes other than triangular.

The deployable arm 50 is illustratively linear in shape and extends, in the non-deployed position of the barricade 30'" illustrated in FIG. 4A, at least partially along the length of the frame component 14C of the motor vehicle 12, and the deployable arm 54 is likewise linear in shape and extends, in the non-deployed position of the barricade 30'", at least partially along the length of the frame component 14B of the motor vehicle 12. One end 50A of the deployable arm 50 is hinged to the frame component 14C, e.g., at or near the junction of the frame components 14A, 14C, via a conventional hinge 52, e.g., a hinge pin or other conventional hinge structure, and an opposite end 50B of the arm 50 extends rearwardly toward the junction 14E of the frame components 14B, 14C. One end 54A of the deployable arm 54 is likewise hinged to the frame component 14B, e.g., at or near the lower end thereof adjacent to the top edge 24A of the closure 24, via a conventional hinge 56, e.g., a hinge pin or other conventional hinge structure, and an opposite end 54B of the arm 54 extends upwardly toward the junction 14E of the frame components 14B, 14C. In the illustrated embodiment, the ends 50B, 54B of the arms 50, 54 form a hinge, e.g., a living hinge, which allows the arms 50, 54 to move diagonally away from the junction 14E of the frame components 14B, 14C. In alternate embodiments, the ends 50B, 54B may not be connected to one another.

In the illustrated embodiment, the deployable restraint barricade 30'"includes the actuators 40, 40' coupled to the respective frame components 14A, 14C and operable as described above with respect to FIG. 3. In the embodiment illustrated in FIGS. 4A, 4B, the free end of the cord or cable 38 is coupled to the deployable arm 50 at or near the hinge 58, and the free end of the cord or cable 45 is coupled to the deployable arm 54 at or near the hinge 58, although in other embodiments these connections may be reversed or the cords 38 and/or 45 may be attached to other portions of the arm(s) 50, 54 and/or to the curtain 36".

In the non-deployed state of the barricade 30'" illustrated in FIG. 4A, the actuators 40, 40' are both deactivated such that the deployable arm 50 is positioned adjacent to the frame component 14C of the motor vehicle 12 and the deployable arm 54 is positioned adjacent to the frame component 14B of the motor vehicle 12. In this state, the actuator 40 is deactivated such that the arm 40B is fully extended from the body 40A which, in turn, results in the longest length of the cord or cable 38 between the pulley 42 and the attachment point of the end of the cord or cable 38 to the deployable arm 50. The actuator 40' is also deactivated (obscured in FIG. 4A by the arm 50) such that the arm 40B' of the actuator 40' is fully extended from the body 40A' which, in turn, results in the shortest length of the cord or cable 45 between the pulley 43 and the attachment point of the end of the cord or cable 38 to the deployable arm 54. It is this shortened length of the cord or cable 45 which maintains the arms 50, 54 in their non-deployed positions.

In the deployed state of the barricade 30'" illustrated in FIG. 4B, the actuators 40, 40' are both activated such that the deployable arms 50, 54 together extend end-to-end diagonally across the portion 26 of the occupant access opening 22 with the curtain 36'"coupled to, and deployed between, the arms 50, 54, the frame component 14B and the frame component 14C. In this state, the actuator 40 is activated such that the arm 40B is fully retracted within the body 40A which, in turn, results in the shortest length of the cord or cable 38 between the pulley 42 and the attachment point of the end of the cord or cable 38 to the deployable arm 50. The actuator 40' is also activated such that the arm 40B' of the actuator 40' is fully retracted within the body 40A' which, in turn, results in the longest length of the cord or cable 45 between the pulley 43 and the attachment point of the end of the cord or cable 38 to the deployable arm 54. It is the movement of the cord or cable 38 from its longest to its shortest length which deploys the arms 50, 54 of the restraint barricade 30'" as illustrated in FIG. 4B, and it is the movement of the cord or cable 45 from its longest to its shortest length which resets the arms 50, 54 to the non-deployed position of the barricade illustrated in FIG. 4A.

In some alternate embodiments, the actuator 40 and/or the actuator 40' may be mounted to other frame components of the motor vehicle 12 and/or may be operatively coupled to different portions of the restraint barricade 30'''. In other alternate embodiments, either or both of the hinges 52, 56 may be biased in a conventional manner so as to bias the restraint barricade to the deployed or non-deployed position, thereby potentially eliminating at least one of the actuators 40, 40'.

Figure 5A:
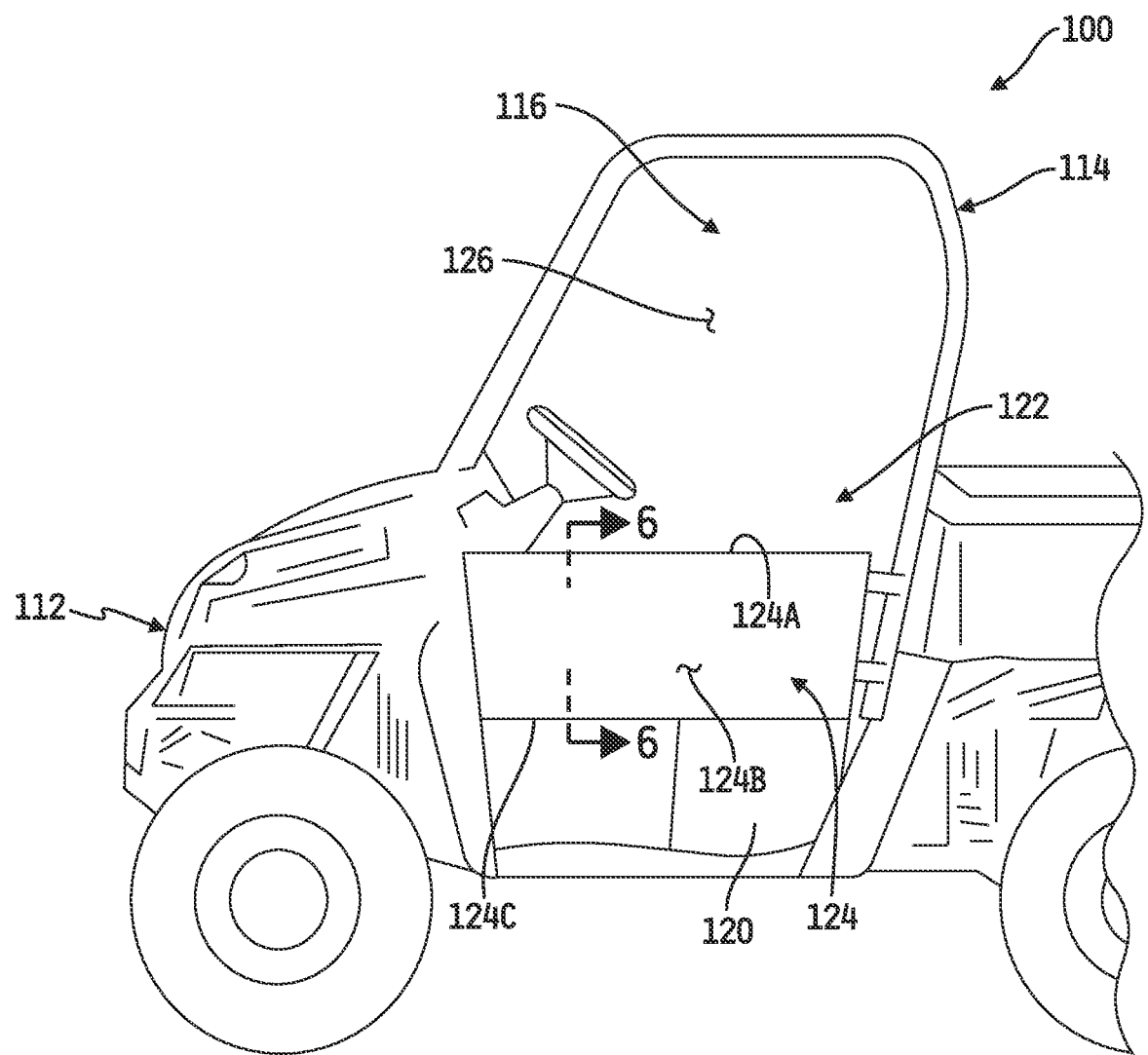
FIG. 5A is a simplified perspective view of a further embodiment of a deployable restraint barricade mounted to a motor vehicle.
Figure 5B:
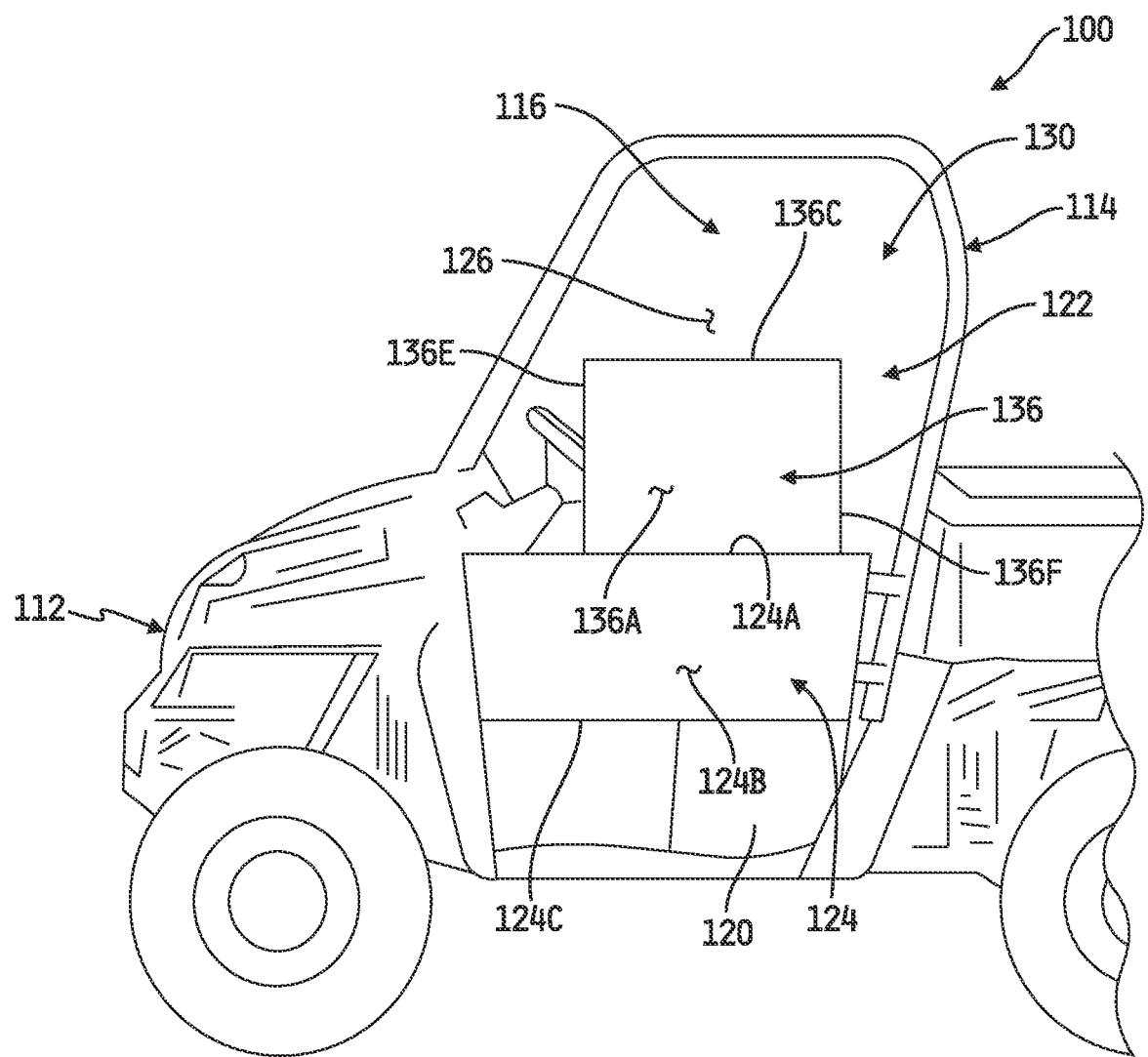
FIG. 5B is a simplified perspective view of the deployable restraint barricade and motor vehicle of FIG. 5A showing the restraint barricade in a deployed state.

Referring now to FIGS. 5A and 5B, a deployable restraint barricade system 100 is shown in which an embodiment of a deployable restraint barricade 130 is mounted to a motor vehicle 112. The motor vehicle 112 is similar to the motor vehicle 12 illustrated in FIGS. 1A-4B, and components of the motor vehicle are identified by similar reference numbers offset by a factor of 100. With the exception of the access closure 124, the description of such components will not be repeated here for brevity.

Figure 6:
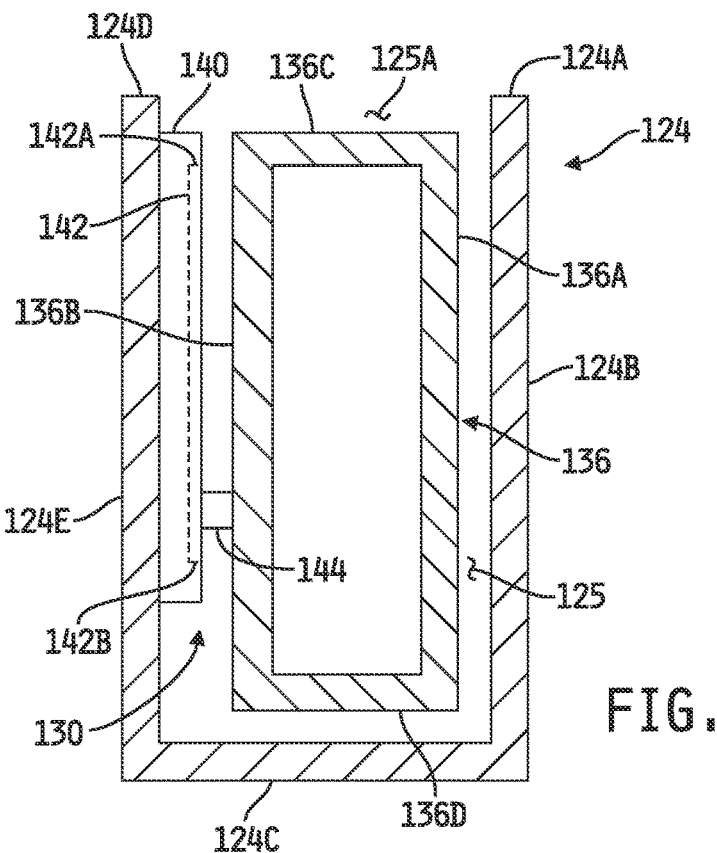
FIG. 6 is a cross-sectional view of the vehicle access closure of the embodiment of FIGS. 5A and 5B as viewed along section lines 6-6 of FIG. 5A.

In the embodiment of the system 100 illustrated in FIGS. 5A and 5B, an embodiment is shown of a deployable restraint barricade 130 provided in the form of a rigid or semi-rigid panel 136 movably mounted to and within the access closure 124. In its non-deployed state illustrated in FIG. 5A, the restraint barricade panel 136 is completely recessed within the access closure 124 and therefore not visible in FIG. 5A, and in its deployed state illustrated in FIG. 5B the restraint barricade panel 136 extends upwardly from within the access closure 124 and extends at least partially over the portion 126 of the occupant access opening 122. As best depicted in FIG. 6, the access closure 124 illustratively includes an external skin 124B spaced apart from an internal skin 124E, and the two skins 124B, 124E are joined together at a bottom of the access closure 124 by a bottom skin or plate 124C. The external skin 124B terminates at the top edge 124A depicted in FIGS. 5A and 5B, and the internal skin 124E terminates at a top edge 124D. The space 125 defined between the skins 124B, 124E defines an open end 125A adjacent to and between the top edges 124A, 124D.

The panel 136 of the restraint barricade 130 is disposed in the space 125 between the access closure skins 124B, 124D of the access closure 124. In the embodiment illustrated in FIG. 6, the panel 136 is implemented in the form of a hollow rectangular panel having opposing, spaced apart, planar faces 136A and 136B joined along their top ends by a top member 136C and along their bottom ends by a bottom member 136D. In one embodiment, the panel 136 is formed of a metal or metal composite material, although in other embodiments the panel 136 may be additionally or alternatively formed of one or more other materials, examples of which may include, but are not limited to, one or more plastic materials, e.g., polymers, one or more reinforced or reinforcing fiber materials, one or more textiles, and combinations thereof. In other alternate embodiments, the panel 136 may be provided in the form of a solid panel or may be formed of multiple sheets or layers.

An example embodiment of an actuator 140 is shown in FIG. 6 mounted to the inner surface of the access closure skin 124E. In the illustrated example, the actuator 140 is a conventional elongated linear actuator defining an elongated channel 142 therein terminating at opposite channel ends 142A, 142B. One end of a guide member 144, e.g., a rod, bolt or the like, is secured to the panel 136 and an opposite end is operatively engaged with the channel 142 of the actuator 140. In response to activation of the actuator 140, as will be described in greater detail with respect to FIGS. 7-8B, the actuator 140 is operable to deploy the panel 136 by drawing the guide member 144 upwardly along the channel 142 to extend at least a portion of the panel 136 upwardly and out of the opening 125A of the space 125 as illustrated by example in FIG. 5B. The actuator 140 may also be responsive to suitable activation or deactivation of the actuator 140 to draw the panel 136 back into the space 125 between the skins 124B, 124E of the access closure 124 to return the panel 136 to the non-deployed state. Although only one actuator 140 is shown in FIG. 6, it will be understood that two more actuators may be used in alternate embodiments. Alternatively or additionally, one or more non-linear actuators may be used. In other alternate embodiments, any one or combination of any conventional actuator(s) may be used in place of or in addition to the illustrated actuator 140. Moreover, although the actuator 140 is illustrated in FIG. 6 as being mounted to the inner surface of the access closure skin 124E, it will be understood that in alternate embodiments the actuator 140 may instead be mounted to any surface of the access closure, within the space 125 or outside of the space 125.

The panel 136 may illustratively be sized such that the top 136C member extends any desired distance above the top edges 124A, 124D of the access closure skins 124B, 124E respectively, and the width of the panel 136 between opposed sides 136A, 136B thereof may likewise be sized as desired. It will be understood that although the panel 136 is illustrated in FIGS. 5B and 6 in the form of a generally rectangular panel, such a geometry is illustrated only by way of example and the panel 136 may alternatively take any desired shape. Moreover, it will be understood that although the panel 136 is illustrated in FIGS. 5B and 6 in the form of a single panel, other embodiments are contemplated in which the panel 136 may include two or more panels rigidly or movably coupled together. In one particular such embodiment, two or more panels may be hingedly coupled together such that the two or more panels are compacted together to a reduced size to fit within the space 125 of the access closure 124 in the non-deployed position of the panel 136, and such that the two or more panels automatically move about one or more hinges to an expanded configuration upon deployment. It will be further understood that, in addition to the deployable restraint barrier 130, any of the deployable restraint barriers 30, 30', 30'', 30''' may also be operatively mounted to the motor vehicle 112, or in addition to the deployable restraint barrier 30, 30', 30'', 30''', the deployable restraint barrier 130 may also be operatively mounted to the motor vehicle 12.

Figure 7:
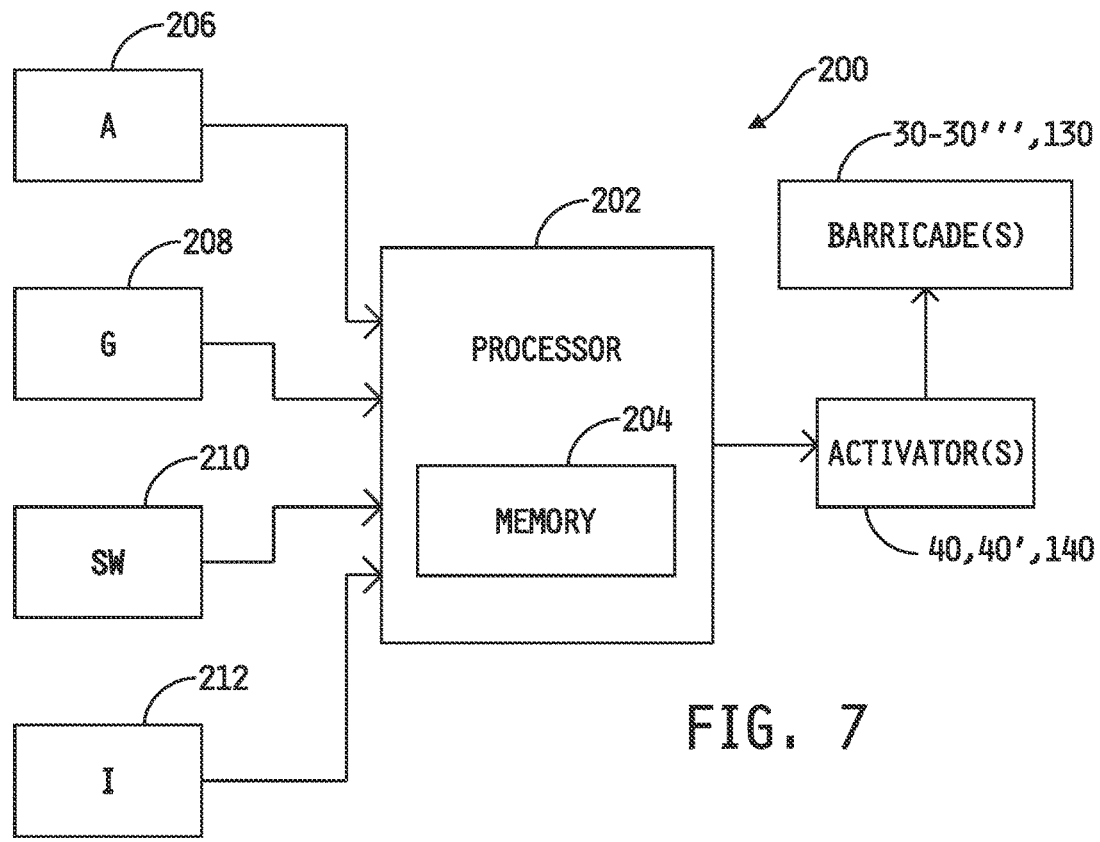
FIG. 7 is a simplified schematic diagram of a system for automatically deploying the deployable restraint barricade of any of FIGS. 1A-6 based on an acceleration condition of the motor vehicle, based on an orientation of the motor vehicle relative to a motor vehicle axis system and/or based on an activation signal produced by a manually activated switch.

Referring now to FIG. 7, a system 200 is shown for automatically deploying any of the deployable restraint barricades 30, 30', 30'', 30''', 130 described above and illustrated by example in the attached figures. In the illustrated embodiment, the system 200 includes a processor 202 having a memory 204 or coupled to a memory 204. The processor 200 is illustratively conventional and may be or include one or more microprocessors, one or more controllers, one or more field programmable gate arrays, one or more application specific integrated circuits, or the like. The memory 204 is likewise illustratively conventional and may be provided in the form of one or more conventional memory units.

The system 200 illustratively includes a number of conventional sensors mounted to or within the motor vehicle 12, 112. In some embodiments, for example, at least one accelerometer 206 may be mounted to or within the motor vehicle 12, 112 and operatively coupled, e.g., wired or wirelessly, to the processor 202. In one embodiment, the at least one accelerometer 106 is provided in the form of a conventional three-axis accelerometer mounted to the motor vehicle 12, 112 such that each axis is aligned with a corresponding one of an axis system of the motor vehicle 12, 112. In some alternate embodiments, two dual axis accelerometers and a single axis accelerometer may be used, and in other alternate embodiments three single-axis accelerometers may be used. In embodiments in which only vehicle motion about two axes is needed, a dual axis accelerometer or two single axis accelerometers may be used.

Figure 8A:
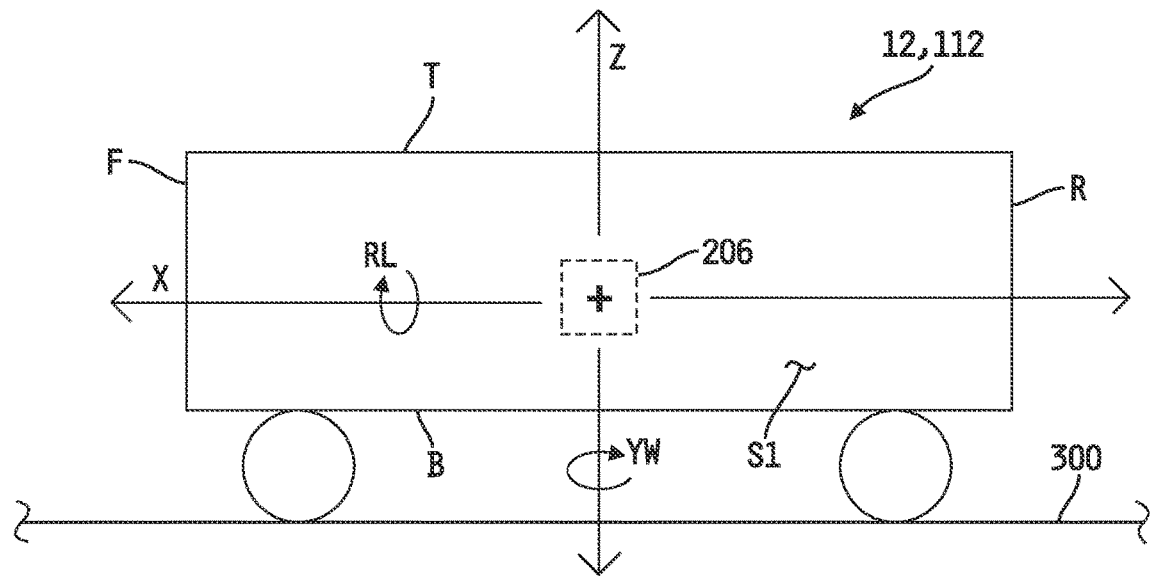
FIG. 8A is a simplified diagram of a motor vehicle depicting two of the three axes of the motor vehicle relative to an example sensor.
Figure 8B:
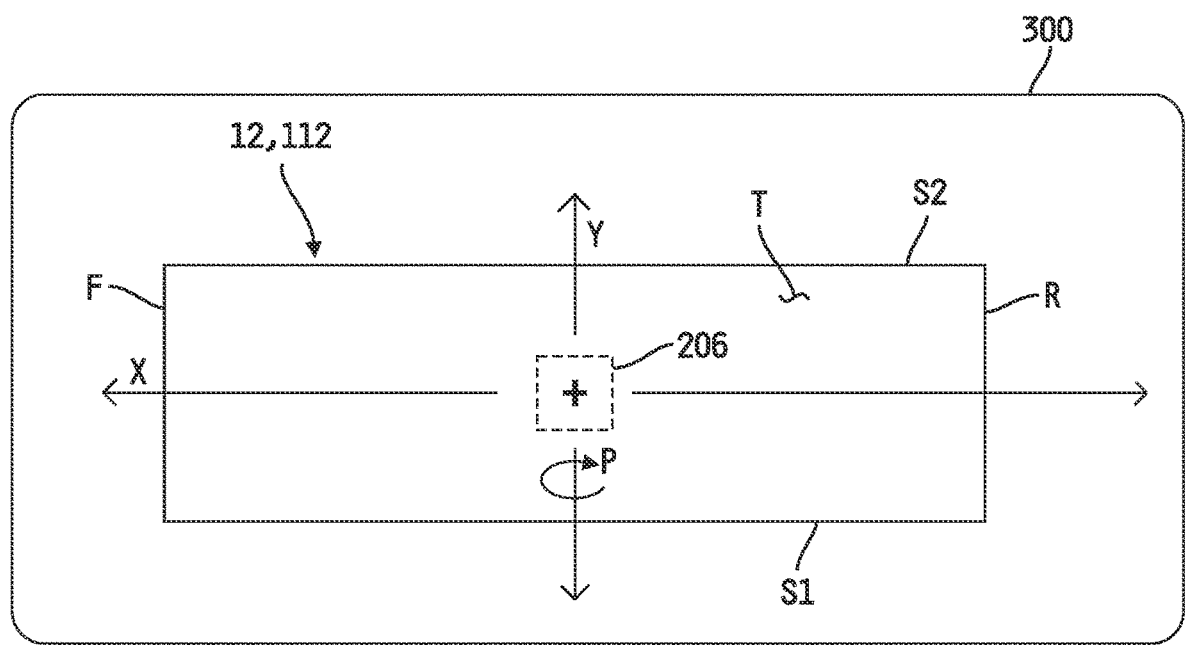
FIG. 8B is a simplified diagram of the motor vehicle of FIG. 8A depicting another two of the three axes of the motor vehicle relative to the example sensor.

Referring to FIGS. 8A and 8B, the axis system of the motor vehicle is illustratively a conventional Society of Automotive Engineers (SAE) vehicle axis system in which the x-axis of a conventional 3-dimensional Cartesian coordinate system extends longitudinally through the motor vehicle 12, 112, i.e., between and through the front F and rear R of the motor vehicle 12, 112, the y-axis extends laterally through the motor vehicle 12, 112, i.e., between and through opposite sides S1 and S2 of the motor vehicle 12, 112, and the z-axis extends vertically through the motor vehicle 12, 112, i.e., between and through the top T and bottom B of the motor vehicle 12, 112. A 3-axis accelerometer 206 is illustratively shown mounted to the motor vehicle 12, 212 such that one axis of the accelerometer is aligned with, i.e., is collinear with, the x-axis, another is aligned with, i.e., is collinear with, the y-axis, and the third axis is aligned with, i.e., is collinear with, the z-axis. In a stationary motor vehicle 12, 112 on flat terrain 300, the output of the sensor 206 will correlate to the origin of all three axes. Under vehicle tilt and/or roll conditions, RL, i.e., when the motor vehicle 12, 112 rotates about the x-axis, the output of the sensor 106 will correspond to an angle relative to the x-axis. Under vehicle pitch conditions, P, i.e., when the motor vehicle 12, 112 rotates about the y-axis, the output of the sensor 206 will correspond to an angle relative to the y-axis, and under vehicle yaw conditions, YW, i.e., when the motor vehicle 12, 112 rotates about the z-axis, the output of the sensor 206 will correspond to an angle relative to the z-axis.

Referring again to FIG. 7, the system 200 may further include a gyroscope 208 mounted to or within the motor vehicle 12, 112 and operatively coupled, e.g., wired or wirelessly, to the processor 202. In embodiments which include it, the gyroscope 208 is provided in the form of a conventional solid state gyroscope mounted to the motor vehicle 12, 112 and operable to produce one or more signals from which the orientation of the motor vehicle, e.g., relative to one or more of the vehicle axes, and/or from which angular velocity relative to any such axis can be determined. In some embodiments, the gyroscope 208 may be provided in the form of two or more gyroscopes. In some embodiments, the gyroscope 208 is included for the purpose of calibrating the accelerometer(s) 206, i.e., along at least one axis and/or vice versa. In other embodiments in which the accuracy of the accelerometer(s) 206 is/are stable under all operating conditions, the gyroscope 208 may be omitted. In still other embodiments, signals produced by the gyroscope 208 may be used in combination with signals produced by the accelerometer(s) 206. In still other embodiments, signals produced by the gyroscope 208 may be used to the exclusion of at least some of the signals produced by the accelerometer(s).

The system 200 may further include a switch 210 mounted to or within the motor vehicle 12, 112 and operatively coupled, e.g., wired or wirelessly, to the processor 202. In embodiments which include it, the switch 210 is illustratively provided in the form of a conventional single pole, single throw switch mounted to the motor vehicle 12, 112 and operable to produce a switch activation and deactivation signal upon manual manipulation thereof.

In some embodiments, the system 200 may further include an impact sensor 212 mounted to or within the motor vehicle 12, 112 and operatively coupled, e.g., wired or wirelessly, to the processor 202. In embodiments which include it, the impact sensor 212 is illustratively provided in the form of one or more conventional impact sensors configured to produce one or more signals corresponding to an impact of the motor vehicle 12, 112 with an object along any desired direction of the motor vehicle 12, 112.

The system 300 further illustratively includes one or more actuators 40, 40', 140 as briefly described above with respect to the various embodiments of the deployable restraint barricades 30-30''', 130. The actuator(s) 40, 40', 140 is/are illustratively mounted to or within the motor vehicle 12, 112, operatively coupled, e.g., wired or wirelessly, to the processor 202, and operatively coupled, e.g., directly or via one or more conventional coupling structures, to a deployable restraint barricade 30-30''', 130 as described above. In embodiments which include a combination of two such deployable restraint barricades, e.g., any two of the deployable restraint barricades 30-30''', 130, the one or more actuators 40, 40' 140 illustratively include(s) at least one actuator for each. In some embodiments, the one or more actuators 40, 40' 140 may be provided in the form of one or more conventional, electronically controlled mechanical actuators, e.g., linearly or non-linearly translating. In some such embodiments, the actuator(s) 40, 40' 140 is/are responsive to an activation signal to deploy a respective one or more of the deployable restraint barricades 30-30''', 130, and is/are responsive to a deactivation signal produced by the processor 202 to return the respective one or more of the deployable restraint barricades 30'30''', 130 to a non-deployed state and position. In some alternate embodiments, the one or more actuators 40, 40' 140 may be provided in the form of one or more conventional gas-pressure actuators. In some such embodiments, the actuator(s) 40, 40' 140 may, for example, include an electrically actuated incendiary device responsive to an activation signal to cause a pressurized container to release pressurized gas to deploy a respective one or more of the deployable restraint barricades 30-30''', 130. In such embodiments, the one or more of the deployable restraint barricades 30-30''', 130 may be manually returned to a non-deployed state or position and replacement of at least a portion of the actuator(s) may be required before the next activation thereof. In alternate embodiments, the gas-pressure actuator(s) 40, 40' 140 may be coupled to a source of pressurized gas and may be configured to selectively release gas after activation so as to cause the respective one or more of the deployable restraint barricades 30-30''', 130 to be returned to a non-deployed state and position. Those skilled in the art will recognize other conventional actuators that may be used, and it will be understood that any such other conventional actuator(s) are intended to fall within the scope of this disclosure.

In some embodiments, the memory 204 illustratively has instructions stored therein which, when executed by the processor 202, causes the processor 202 to activate the actuator(s) 40, 40' 140 to deploy one or more of the deployable restraint barricades 30-30''', 130 based on signals produced by one or more of the sensors 206, 208, 210, 212. In one such embodiment, for example, the instructions stored in the memory 204 include instructions which, when executed by the processor 202, cause the processor 202 to monitor signals produced by the accelerometer 206 and to produce a control signal to activate the actuator(s) 40, 40'

140 to deploy one or more of the deployable restraint barricades 30-30''', 130 if the signals produced by the accelerometer 206 indicate that the motor vehicle 12, 112 has rotated about the x-axis to an angle greater than a threshold angle relative to a reference angle, e.g., zero degrees. In some such embodiments, the processor 202 may be further operable to process the signals produced by the accelerometer 206 to determine a rate of rotation about the x-axis, and in such embodiments the processor 202 may be operable to produce the control signal to activate the actuator(s) 40, 40' 140 to deploy one or more of the deployable restraint barricades 30-30''', 130 if the signals produced by the accelerometer 206 indicate that the motor vehicle 12, 112 has rotated about the x-axis to an angle greater than the threshold angle and the rate of rotation about the x-axis is greater than a threshold rate of rotation. In any case, the processor 202 is operable in this embodiment to determine, based on signals produced by the accelerometer 206, whether a sideways roll of the motor vehicle 12, 112 in either direction is imminent and, if so, to activate the actuator(s) 40, 40' 140 to deploy one or more of the deployable restraint barricades 30-30''', 130.

In another embodiment, which may be independent from or combined with the previously described embodiment, the instructions stored in the memory 204 include instructions which, when executed by the processor 202, cause the processor 202 to monitor signals produced by the accelerometer 206 and to produce a control signal to activate the actuator(s) 40, 40' 140 to deploy one or more of the deployable restraint barricades 30-30''', 130 if the signals produced by the accelerometer 206 indicate that the motor vehicle 12, 112 has rotated about the y-axis to an angle greater than a threshold angle relative to a reference angle, e.g., zero degrees. In some such embodiments, the processor 202 may be further operable to process the signals produced by the accelerometer 206 to determine a rate of rotation about the y-axis, and in such embodiments the processor 202 may be operable to produce the control signal to activate the actuator(s) 40, 40' 140 to deploy one or more of the deployable restraint barricades 30-30''', 130 if the signals produced by the accelerometer 206 indicate that the motor vehicle 12, 112 has rotated about the y-axis to an angle greater than the threshold angle and the rate of rotation about the y-axis is greater than a threshold rate of rotation. In any case, the processor 202 is operable in this embodiment to determine, based on signals produced by the accelerometer 206, whether a forward or rearward roll or tip of the motor vehicle 12, 112 is imminent and, if so, to activate the actuator(s) 40, 40' 140 to deploy one or more of the deployable restraint barricades 30-30''', 130.

In yet another embodiment, which may be independent from or combined with either or both of the previously described embodiments, the instructions stored in the memory 204 include instructions which, when executed by the processor 202, cause the processor 202 to monitor signals produced by the accelerometer 206 and to produce a control signal to activate the actuator(s) 40, 40' 140 to deploy one or more of the deployable restraint barricades 30-30''', 130 if the signals produced by the accelerometer 206 indicate that the movement of the motor vehicle 12, 112 along the z-axis is at or near zero. In many applications, and particularly in off-road applications, for example, the motion of the motor vehicle 12, 112 along the z-axis will normally continually change based on the conditions of the terrain 300 upon which the motor vehicle 12, 112 is operating. If the motor vehicle 12, 112 becomes airborne, however, the signal produced by the accelerometer 206 will indicate that movement of the motor vehicle 12, 112 along the z-axis is at or near zero since the terrain 300 will no longer be working against the tires/wheels of the motor vehicle 12, 112. In some such applications, it may thus be desirable to deploy one or more of the deployable restraint barricades 30-30''', 130 if the motor vehicle 12, 112 is detected as being airborne due to the possibility that the motor vehicle 12, 112 may roll when it thereafter comes back into contact with the terrain 300. The processor 202 is thus operable in this embodiment to determine, based on signals produced by the accelerometer 206, whether the motor vehicle 12, 112 is airborne and, if so, to activate the actuator(s) 40, 40' 140 to deploy one or more of the deployable restraint barricades 30-30''', 130.

In still another embodiment, which may be independent from or combined with any one or combination of the previously described embodiments, the instructions stored in the memory 204 include instructions which, when executed by the processor 202, cause the processor 202 to monitor the switch 210 and to produce a control signal to activate the actuator(s) 40, 40' 140 to deploy one or more of the deployable restraint barricades 30-30''', 130 if the signals produced by the switch 210 indicates that it has been manually activated.

In still a further embodiment, which may be independent from or combined with any one or combination of the previously described embodiments, the instructions stored in the memory 204 include instructions which, when executed by the processor 202, cause the processor 202 to monitor signals produced by the impact sensor 210 and to produce a control signal to activate the actuator(s) 40, 40' 140 to deploy one or more of the deployable restraint barricades 30-30''', 130 if the signals produced by the impact sensor 210 indicate that the motor vehicle 12, 112 has impacted or has become impacted by an object.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected. For example, whereas the various actuators 40, 40', 140 have been described above by example as being electrically actuatable, it will be understood that any of the actuators described herein may alternatively or additionally be configured to be mechanically, pneumatically or hydraulically actuated and/or actuated via a conventional pressurized gas source, e.g., via a conventional, electrically actuated (or otherwise actuated) incendiary device or other conventional actuation device. As another example, it will be understood that the operative connections between the various actuators 40, 40', 140 and the respective portion(s) of the curtains 36, 36', 36'', e.g., via the respective cords or cables 38, 45 and pulleys 42, 43, 44, are provided only by way of example, and that other conventional structures and/or mechanisms may alternatively or additionally be used to provide an operative interface between any one or more of the actuators and one or more portions of any of the respective curtains. Those skilled in the art will recognize that any such substitution would be a mechanical step for a skilled artisan, and it will be understood that any such alternative operative connection(s) is/are intended to fall within the scope of this disclosure.

What is claimed is:

1. A restraint barricade control system, comprising:
a restraint barricade configured to be mounted to a motor vehicle at or adjacent to an occupant access opening thereof, the restraint barricade having an non-deployed state in which the restraint barricade is stowed adjacent to the occupant access opening or is recessed within an occupant access closure of the motor vehicle, and a deployed state in which the restraint barricade extends over at least a portion of the occupant access opening or is extended away from the occupant access closure over at least a portion of the occupant access opening, at least one sensor configured to produce at least one sensor signal corresponding to movement of the motor vehicle relative to at least one axis of an axis system of the motor vehicle, wherein the at least one axis includes a first axis defined longitudinally through the motor vehicle, at least one actuator operatively coupled to the restraint barricade, a processor operatively coupled to the at least one sensor and to the at least one actuator, and a memory having instructions therein which, when executed by the processor, causes the processor to activate the at least one actuator to deploy the restraint barricade from the non-deployed state to the deployed state based on the at least one sensor signal, wherein the instructions stored in the memory include instructions which, when executed by the processor, cause the processor to activate the at least one actuator if the at least one sensor signal indicates that the motor vehicle has rotated about the first axis to an angle greater than a first threshold angle relative to a first reference angle.

2. The system of claim 1, wherein the instructions stored in the memory include instructions which, when executed by the processor, cause the processor to activate the at least one actuator if the at least one sensor signal indicates that the motor vehicle is rotating about the first axis at rate of rotation greater than a first threshold rate of rotation.

3. The system of claim 1, wherein the at least one axis includes a second axis defined laterally through the motor vehicle and normal to the first axis, and wherein the instructions stored in the memory include instructions which, when executed by the processor, cause the processor to activate the at least one actuator if the at least one sensor signal indicates that the motor vehicle has rotated about the second axis to an angle greater than a second threshold angle relative to a second reference angle.

4. The system of claim 3, wherein the instructions stored in the memory include instructions which, when executed by the processor, cause the processor to activate the at least one actuator if the sensor signal indicates that the motor vehicle is rotating about the second axis at rate of rotation greater than a second threshold rate of rotation.

5. The system of claim 3, wherein the at least one axis includes a third axis defined vertically through the motor vehicle and normal to each of the first and second axes, and wherein the at least one sensor signal includes at least one acceleration signal corresponding to a rate of acceleration of the motor vehicle along the third axis, and wherein the instructions stored in the memory include instructions which, when executed by the processor, cause the processor to activate the at least one actuator if the at least one acceleration signal indicates that acceleration of the motor along the third axis is at or near zero.

6. The system of claim 1, wherein the at least one sensor includes at least one manually actuatable switch, and wherein the instructions stored in the memory include instructions which, when executed by the processor, cause the processor to activate the at least one actuator if the at least one sensor signal indicates manual activation of the at least one manually actuatable switch.

7. The system of claim 1, wherein the at least one sensor includes at least one impact sensor, and wherein the instructions stored in the memory include instructions which, when executed by the processor, cause the processor to activate the at least one actuator if the at least one sensor signal indicates an impact of the motor vehicle with an object.

8. The system of claim 1, wherein the restraint barricade comprises a deployable curtain configured to be mounted to at least one frame component of the motor vehicle adjacent to the occupant access opening, and wherein the deployable curtain is stowed adjacent to the at least one frame component in the non-deployed state of the restraint barricade and extends at least partially over the occupant access opening in the deployed state of the restraint barricade, and wherein the deployable curtain is operatively coupled to the at least one actuator.

9. The system of claim 8, wherein the restraint barricade includes an elongated tube rotatably mounted at opposite ends thereof to respective brackets secured to the at least one frame component, and wherein the deployable curtain is wrapped about the elongated tube in the non-deployed state of the restraint barricade, and wherein the elongated tube is rotatable about a longitudinal axis thereof relative to the brackets in a roll-up direction to take up the curtain onto the elongated tube, and in a pay-out direction to pay out the curtain from the elongated tube, and wherein activation of the at least one actuator causes the actuator to draw the deployable curtain away from the elongated tube such that the elongated tube rotates relative to the brackets in the pay-out direction to deploy the deployable curtain at least partially over the occupant access opening.

10. The system of claim 9, wherein the elongated tube is biased to rotate relative to the brackets in the roll-up direction, and wherein deactivation of the at least one actuator causes the elongated tube to rotate under bias in the roll-up direction to take up the curtain thereon to return the restraint barricade to the non-deployed state thereof.

11. The system of claim 9, wherein the at least one actuator comprises a linear actuator mounted to the at least one frame component, the linear actuator having an elongated body and an elongated arm extendable from and retractable within the body, and wherein a free end of the elongated arm is operatively coupled to the deployable curtain, and wherein the actuator is responsive to actuation thereof to extend the elongated arm from the elongated body or to retract the elongated arm into the elongated body to deploy the deployable curtain.

12. The system of claim 8, wherein the at least one actuator comprises a linear actuator mounted to the at least one frame component, the linear actuator having an elongated body and an elongated arm extendable from and retractable within the body, and wherein a free end of the elongated arm is operatively coupled to the deployable curtain, and wherein the actuator is responsive to actuation thereof to extend the elongated arm from the elongated body or to retract the elongated arm into the elongated body to deploy the deployable curtain to the deployed state of the restraint barricade.

13. The system of claim 8, wherein the deployable curtain is in the form of a solid sheet or a net.

14. The system of claim 1, wherein the restraint barricade comprises a deployable panel configured to be mounted within the access closure of the motor vehicle, and wherein the deployable panel is recessed within the access closure in the non-deployed state of the restraint barricade, and extends upwardly away from the access closure and at least partially over the occupant access opening in the deployed state of the restraint barricade, and wherein the deployable panel is operatively coupled to the at least one actuator.

15. The system of claim 14, wherein the at least one actuator comprises a linear actuator mounted to the access closure, the linear actuator having a channel and a guide member movable along the channel, and wherein the guide member is operatively coupled to the deployable panel, and wherein the actuator is responsive to actuation thereof to move the guide member along the channel to deploy the deployable panel to the deployed state of the restraint barricade.

16. A restraint barricade for a motor vehicle, comprising:
a restraint curtain or net configured to be mounted to the motor vehicle at or adjacent to an occupant access opening of the motor vehicle, the restraint curtain or net having an non-deployed state in which the restraint curtain or net is stowed adjacent to the occupant access opening or is recessed within an occupant access closure of the motor vehicle, and a deployed state in which the restraint barricade extends over at least a portion of the occupant access opening or is extended away from the occupant access closure over at least a portion of the occupant access opening, at least one actuator configured to be mounted to the motor vehicle, the at least one actuator operatively coupled to the restraint curtain or net, the at least one actuator responsive to activation thereof to deploy the restraint curtain or net from the non-deployed state to the deployed state, and means for returning the restraint curtain or net from the deployed state to the non-deployed state upon deactivation of the at least one actuator.

17. A restraint barricade for a motor vehicle, comprising:
a rigid restraint panel configured to be mounted within an access closure disposed over an occupant access opening of the motor vehicle, the rigid restraint panel having an non-deployed state in which the rigid restraint panel is recessed within the occupant access closure of the motor vehicle, and a deployed state in which the rigid restraint panel extends upwardly away from the occupant access closure and over at least a portion of the occupant access opening, and at least one actuator configured to be mounted to the access closure, the at least one actuator operatively coupled to the rigid restraint panel, the at least one actuator responsive to activation thereof to deploy the rigid restraint panel from the non-deployed state to the deployed state.

18. The restraint barricade of claim 17, further comprising means for returning the rigid restraint panel from the deployed state to the non-deployed state upon re-activation or deactivation of the at least one actuator.

* * * * *